UNITED STATES PATENT OFFICE.

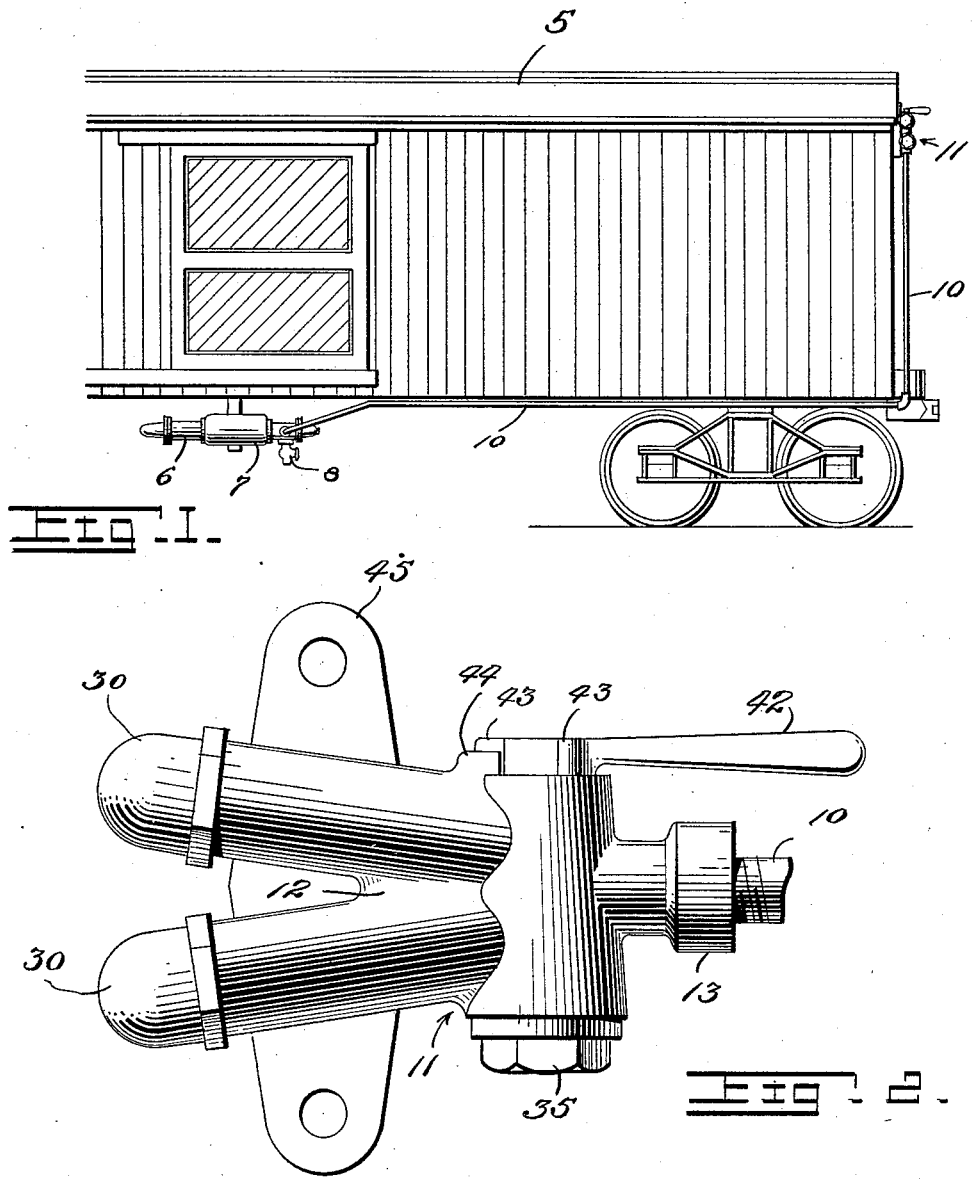

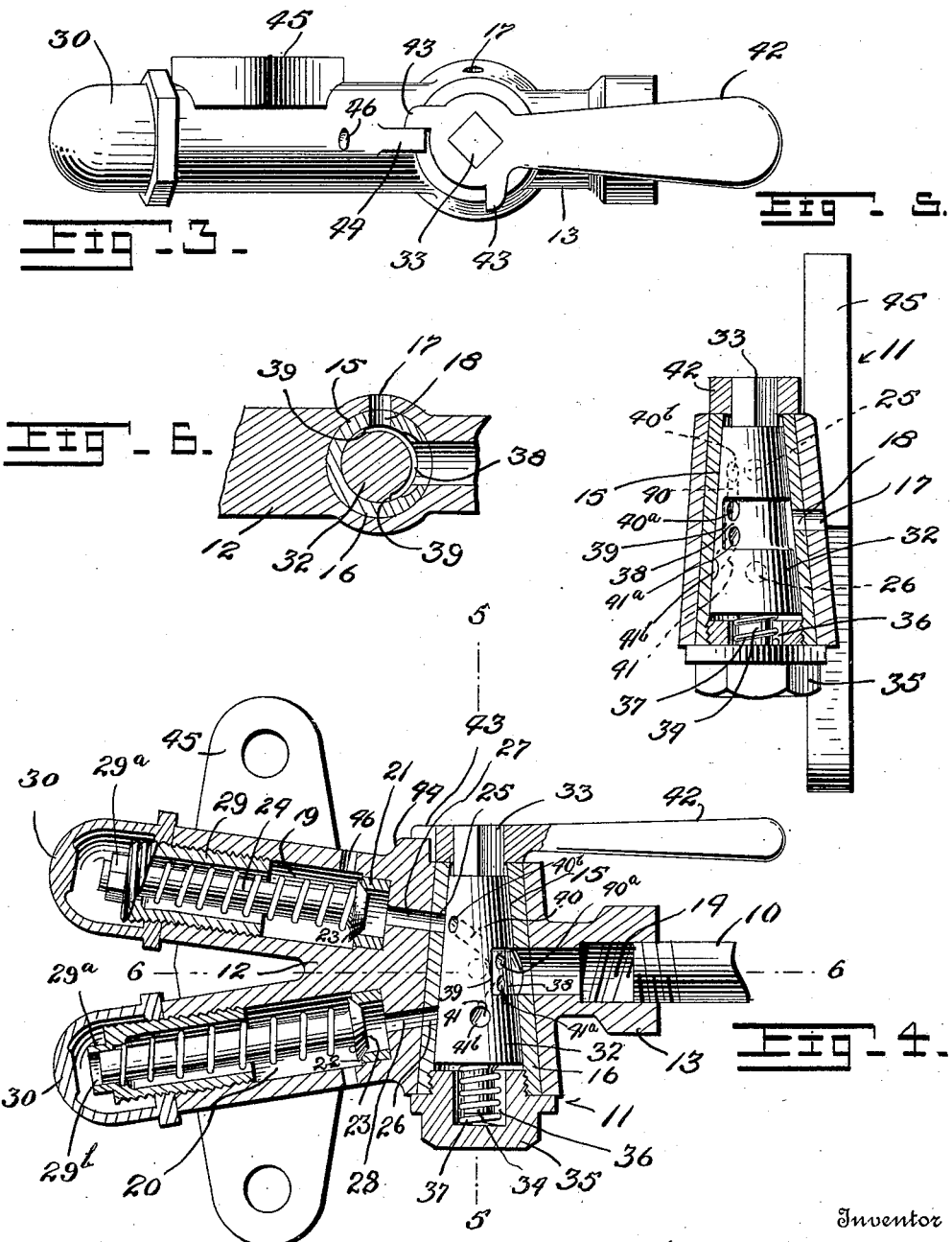

CLAUDE A. BAKER, OF MITCHELL, INDIANA.

PRESSURE-RETAINING MECHANISM FOR FLUID-PRESSURE BRAKES.

1,058,136. Specification of Letters Patent. Patented Apr. 8, 1913.

Application filed February 17, 1912. Serial No. 678,310.

*To all whom it may concern:*

Be it known that I, CLAUDE A. BAKER, a citizen of the United States, residing at Mitchell, in the county of Lawrence, State of Indiana, have invented certain new and useful Improvements in Pressure-Retaining Mechanism for Fluid-Pressure Brakes; and I do hereby declare the following to be a full, clear, and exact description of the invention, such as will enable others skilled in the art to which it appertains to make and use the same.

This invention relates to a pressure retaining valve for fluid pressure brakes.

The principal object of this invention is to provide a valve for retaining within the brake cylinder a pressure of air sufficient to render the brakes effective, and thereby prevent any acceleration of speed of the car or train after the triple valve has moved to position for permitting air to escape from the brake cylinder and while the auxiliary reservoir is being recharged from the train-pipe.

Another object of the invention is to provide a pressure retaining mechanism for the purpose described which includes spring actuated high and low pressure valves and a controlling valve therefor, whereby the speed of the car or train can be readily controlled while descending either a heavy or gradual incline.

A further object of the invention is to provide a mechanism of the character described which includes an extremely simple means for adjusting the tensions of the springs of pressure retaining valves, whereby different maximum and minimum pressures may be readily obtained.

A still further object of the invention is to provide a mechanism of the character described, which is composed of a relatively few number of parts, is therefore simple and compact in construction, and is cheap to manufacture.

With these and other objects in view, the invention consists in the construction and novel combination and arrangement of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings: Figure 1 is a side elevation of a freight car with my invention attached thereto, Fig. 2 is an enlarged front elevation of my improved mechanism, Fig. 3 is a top plan view thereof, Fig. 4 is a longitudinal sectional view therethrough, Fig. 5 is a sectional view taken on the line 5—5 of Fig. 4, Fig. 6 is a sectional view of the controlling valve, taken on the line 6—6 of Fig. 4.

Like reference numerals designate corresponding parts in all the figures of the drawings.

Referring to the drawings, 5 designates the body of a freight or other car and to this body is secured the usual air-brake mechanism including the brake-cylinder 6, auxiliary reservoir 7, triple valve 8 having the usual exhaust to which is connected one end of a pipe 10, the other end of said pipe being positioned near the top and end of the car where it is readily accessible to the brakeman.

My invention comprises a pressure retaining mechanism, designated as a whole by the reference numeral 11. This mechanism includes a body 12 having a nipple 13 extending from one end, said nipple being formed with an air inlet passage 14 adapted to receive the free end of the pipe 10. Centrally formed in the body and disposed at right angles to the passage 14 is an opening 15 wherein is disposed a bushing 16 forming a valve seat, said body and bushing being respectively formed with alined ports 17 and 18 respectively which communicate with the atmosphere. The body 12 on the side of the opening 15 opposite the pipe 14 is formed with upper and lower bores 19 and 20 respectively, said bores being disposed at right angles and in the same plane as the opening 15. Disposed within the inner end of each bore is a bushing 21 having its outer end 22 beveled to form a seat for a valve 23, said valve having a stem 24 extending longitudinally within a respective bore. Formed in the bushing 16 opposite the passage 14 are spaced upper and lower ports 25 and 26 respectively, and formed in the body 12 are upper and lower passages 27 and 28 which communicate with the upper bore 19 and the upper port 25, and the lower bore 20 and the lower port 26 respectively.

The outer ends of the bores 19 and 20 are each threaded for engagement with an exteriorly threaded sleeve 29 which receives the outer end of a respective valve stem 24. The outer end of each sleeve is reduced to form an angular nut $29^a$, and a guide $29^b$ for the outer end of the respective stem. A cap nut 30 incloses the outer ends of the sleeve 29 and valve stem 24, and has threaded engagement with the former. This nut is adapted to bear against the body 12, and thereby securely lock the sleeve against accidental reverse rotation. It will thus be observed that upon adjustment of the sleeve 20, the tension of the spring 31 may be readily regulated.

Disposed within the bushing 16 is a rotary plug 32 having an integral angular projection 33 extending outwardly from its upper end and a stud 34 projecting downwardly from its lower end. In order to yieldingly hold the plug in any adjusted position, there is provided a cap nut 35 which has threaded engagement with the lower end of the bushing 16. This nut is centrally formed with a recess 36 for receiving the stud 34. A coil spring 37 is disposed around said stud, and has one end bearing against the lower end of the plug 32 and its other end against the nut 35. Centrally formed in the plug is an arcuate peripheral passage 38, which is adapted at all times to register with the passage 14. This passage forms resultant end walls 39—39 one of which is adapted to cut off communication between the passage 14 and the ports 17 and 18 when the plug is in one position. Upper and lower inclined ports 40 and 41 are respectively formed in the plug. The lower end $40^a$ of the port 40 communicates with the arcuate passage 38, and has its other end $40^b$ communicating with the periphery of the plug and arranged at forty-five degrees from the port 25 when said plug is in its normal or exhaust position as is shown in Fig. 6 of the drawings, said port 40 being adapted upon a forty-five degree movement of the plug to register with the port 25 of the bushing 16 and consequently with the upper bore 19 when the valve is unseated. The upper end $41^a$ of the lower port 41 also communicates with the arcuate passage 38, and the lower end $41^b$ of said port communicates with the periphery of the plug at a point ninety degrees from the port 26 when said plug is in its normal position, said port 41 being adapted upon a ninety degree movement of the plug to register with the port 26 of the bushing 16 and consequently with the lower bore 20 when the respective valve 23 is unseated. It will thus be observed that the ports are so arranged that when the ports 40 and 41 are not in register with their respective ports 25 and 26, the passage 38 registers with the exhaust ports 17 and 18. When, however, the plug is turned so as to register either the port 40 with the port 25 or the port 41 with the port 26, the end wall 39 of the passage 38 will close the ports 17 and 18.

Secured upon the angular projection 33 of the plug is a handle 42 which is formed with a pair of fingers 43—43 which are disposed at right angles to each other, and are adapted to alternately engage a stop 44 formed on the body 12. These fingers 43 are adapted to engage the stop 44 to respectively hold the plug in a position to register either the port 41 with the port 26 and consequently the bore 20 or to register the port 17 with the port 14, by means of the passage 38. Secured to the body 12 is an attaching plate 45 by means of which this pressure retaining valve may be readily secured to the car.

In practice, one of the springs 31 will be adjusted to such a degree as it will necessitate thirty pounds of air pressure to unseat the respective valve 23, and the other spring will be adjusted to such a degree as to permit of its valve 23 being unseated by a pressure of about fifteen pounds. When the train is going down a steep incline the brakeman will turn the plug 32 by the handle 42 so as to establish communication between the pipe 14 and the upper or lower passage 27 or 28 as the case may be, the passage in question communicating with the bore in which the spring 31 is under greater tension. The pressure of the air from the brake-cylinder being greater than the tension of the spring will cause the valve 23 to become unseated, and as a result, air will pass into the respective bore and out through an exhaust port 46 to the atmosphere. When the car is going down a gradual incline, the rotary plug is shifted so as to establish communication between the passage 14 and the other valve 23. As a result in either case, a sufficient air pressure will be retained within the brake-cylinders to retain the brakes in their set position.

From the foregoing, it will be observed that in the normal position of the valve, the air exhausts through the port 14, passage 38 and ports 18 and 17. When, however, a light application is desired, the plug is given a forty-five degree movement, and when a heavy application is made the plug is given a ninety degree movement as already explained.

What is claimed is:

1. In a valve mechanism for the purpose described, the combination with a body having an air inlet port, of a valve seat formed in the body and having a port communicating with said port, spaced counterbores formed in the body, passages connecting the counterbores and the valve seat, valves in the counterbores for closing said passages, tensioning means for said valves, exhaust ports for said counterbores, a rotary valve disposed in said valve seat, an arcuate peripheral passage formed in the valve and registering with the air inlet port, and inclined ports formed in the valve, each inclined port having one end communicating with the arcuate passage and having its other end disposed so as to register with a respective passage upon the rotation of the valve.

2. In a valve mechanism for the purpose described, the combination with a body having an air inlet port, of a valve seat formed in the body and having a port communicating with said port, spaced counterbores formed in the body, passages connecting the counterbores and the valve seat, valves in the counterbores for closing said passages, tensioning means for said valves, exhaust ports for said counterbores, a rotary valve disposed in said valve seat, an arcuate peripheral passage formed in the valve and registering with the air inlet portion, inclined ports formed in the valve, each inclined port having one end communicating with the arcuate passage and having its other end disposed so as to register with a respective passage upon the rotation of the valve, and means for limiting the rotary movement of said valve, whereby the inclined ports may be alternately registered with said passages.

3. In a valve mechanism for the purpose described, the combination with a body having an air inlet port, of a valve seat formed in the body and having a port communicating with said port, spaced counterbores formed in the body, passages connecting the counterbores and the valve seat, a bushing disposed within the inner end of each counterbore, outwardly opening valves respectively associated with each bushing for closing the pipes, sleeves each having threaded engagement with the outer ends of the counterbores, cap nuts respectively carried by the outer end of the sleeves, coil springs respectively disposed within the counterbores intermediate the valves and the cap nuts for regulating the pressure of the valves, the tension of the springs being regulated upon movement of said sleeves, exhaust ports for said counterbores, and a rotary valve disposed in said valve seats for alternately controlling the passage of air between the air inlet port and said passages.

4. In a valve mechanism for the purpose described, the combination with a body having an air inlet port, of a valve seat formed in the body and having a port communicating with said port, spaced counterbores formed in the body, passages connecting the counterbores and the valve seat, a bushing disposed within the inner end of each counterbore, outwardly opening valves respectively associated with each bushing for closing the pipes, sleeves each having threaded engagement with the outer ends of the counterbores, cap nuts respectively carried by the outer end of the sleeves, coil springs respectively disposed within the counterbores intermediate the valves and the cap nuts for regulating the pressure of the valves, the tension of the springs being regulated upon movement of said sleeves, exhaust ports for said counterbores, a rotary valve disposed in said valve seat for alternately controlling the passage of air between the air inlet port and said passages, and means for limiting the rotary movement of said valve, whereby the inclined ports may be alternately registered with said passages.

In testimony whereof, I affix my signature, in presence of two witnesses.

CLAUDE A. BAKER.

Witnesses:
 SIDNEY B. YERCKER,
 RICHARD A. HUGHS.

---

Copies of this patent may be obtained for five cents each, by addressing the "Commissioner of Patents, Washington, D. C."